United States Patent
Nagao

(10) Patent No.: US 11,095,805 B2
(45) Date of Patent: Aug. 17, 2021

(54) OPTICAL APPARATUS

(71) Applicant: CANON KABUSHIKI KAISHA, Tokyo (JP)

(72) Inventor: Yuki Nagao, Utsunomiya (JP)

(73) Assignee: CANON KABUSHIKI KAISHA, Tokyo (JP)

(*) Notice: Subject to any disclaimer, the term of this patent is extended or adjusted under 35 U.S.C. 154(b) by 108 days.

(21) Appl. No.: 16/443,144

(22) Filed: Jun. 17, 2019

(65) Prior Publication Data

US 2019/0394390 A1 Dec. 26, 2019

(30) Foreign Application Priority Data

Jun. 26, 2018 (JP) .............................. JP2018-121368

(51) Int. Cl.
*H04N 5/232* (2006.01)

(52) U.S. Cl.
CPC ..... *H04N 5/23212* (2013.01); *H04N 5/23216* (2013.01); *H04N 5/23245* (2013.01)

(58) Field of Classification Search
CPC ........... H04N 5/23212; H04N 5/23245; H04N 5/23216
USPC ........................................................ 348/345
See application file for complete search history.

(56) References Cited

U.S. PATENT DOCUMENTS

| | | | |
|---|---|---|---|
| 2013/0064533 A1* | 3/2013 | Nakata | G03B 17/02 396/76 |
| 2017/0034425 A1* | 2/2017 | Hamano | H04N 5/232122 |

FOREIGN PATENT DOCUMENTS

| | | |
|---|---|---|
| JP | 2001-42197 A | 2/2001 |
| JP | 2005-266658 A | 9/2005 |
| JP | 2005266658 * | 9/2005 |
| JP | 2008-164837 A | 7/2008 |
| JP | 2013-016928 A | 1/2013 |
| JP | 2014-066878 A | 4/2014 |

* cited by examiner

*Primary Examiner* — Lin Ye
*Assistant Examiner* — Chan T Nguyen
(74) *Attorney, Agent, or Firm* — Canon U.S.A., Inc. IP Division

(57) ABSTRACT

When a first or a second operation is performed on an operation unit included in a lens apparatus, a memory stores a first or a second state of a focus lens unit detected by an operation detection unit when the first or the second operation is performed. When the first or the second operation is performed on the operation unit after the memory stores the first or the second state, a focus driving unit puts a state of the focus lens unit into the first or the second state.

15 Claims, 5 Drawing Sheets

OPTICAL APPARATUS

BACKGROUND OF THE INVENTION

Field of the Invention

The aspect of the embodiments relates to an optical apparatus including an optical element.

Description of the Related Art

As a lens apparatus (optical apparatus) having a preset function, a lens apparatus described in Japanese Patent Laid-Open No. 2001-42197 is known. The preset function is a function described below. Specifically, the preset function stores a present position of a zoom lens unit or a focus lens unit as a preset position. Then, a user operates an operation ring and thereby the zoom lens unit or the focus lens unit moves to the preset position.

The lens apparatus described in Japanese Patent Laid-Open No. 2001-42197 can store two preset positions different from each other by providing two operation rings for storing the preset positions.

However, in the lens apparatus described in Japanese Patent Laid-Open No. 2001-42197, the operation rings for storing the two preset positions in the lens apparatus are provided in order to store the two preset positions different from each other, so that the structure of the lens apparatus is complicated.

SUMMARY OF THE INVENTION

An apparatus according to an aspect of the embodiments includes an optical element, an adjustment unit for adjusting a state of the optical element, a detection unit for detecting the state of the optical element adjusted by the adjustment unit, a storage unit for storing the state of the optical element detected by the detection unit, and an operation unit. When the optical apparatus is in a storage mode in which the storage unit stores the state of the optical element and a first operation is performed on the operation unit, the storage unit stores a first state of the optical element detected by the detection unit when the first operation is performed. When the apparatus is in the storage mode in which the storage unit stores the state of the optical element and a second operation is performed on the operation unit, the storage unit stores a second state of the optical element detected by the detection unit when the second operation is performed. When the first operation is performed after the storage unit stores the first state, the adjustment unit puts the state of the optical element into the first state. When the second operation is performed after the storage unit stores the second state, the adjustment unit puts the state of the optical element into the second state.

Further features of the disclosure will become apparent from the following description of exemplary embodiments (with reference to the attached drawings).

DESCRIPTION OF THE EMBODIMENTS

Hereinafter, embodiments of the disclosure will be described with reference to the drawings.

First Embodiment

Configuration of Camera System

Figure 1:
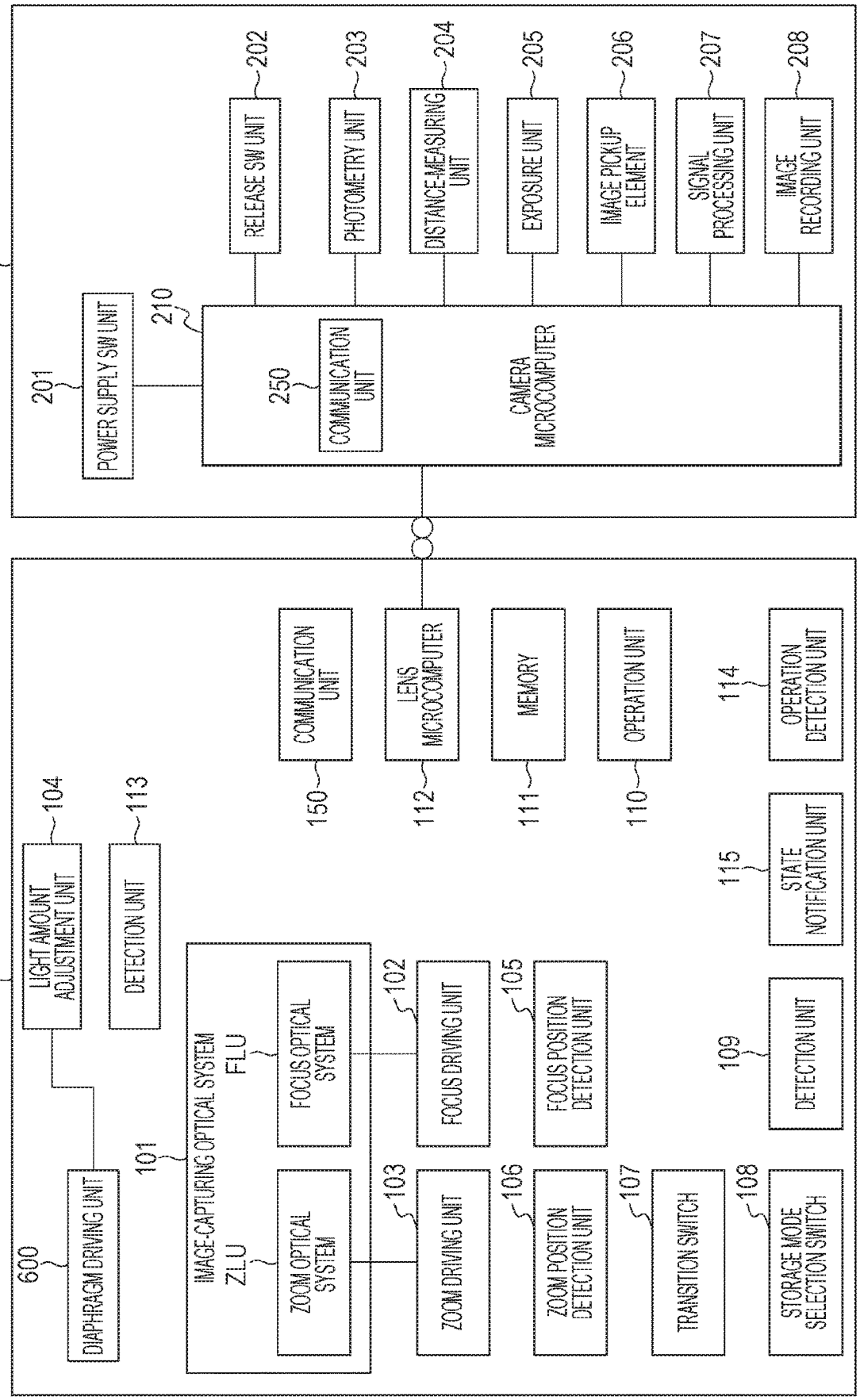
FIG. 1 is a system diagram of a camera system of each embodiment.

A configuration of a camera system of the present embodiment will be described with reference to FIG. 1. The camera system mentioned here is a generic term of a lens apparatus 100 and a camera main body 200. In the present embodiment and a second embodiment described later, the lens apparatus 100 may be defined as an optical apparatus or the camera system may be defined as an optical apparatus. The lens apparatus 100 may be an interchangeable lens, an accessary, or a camera accessary.

Configuration of Camera Main Body 200

The camera main body 200 includes a power supply switch (SW) unit 201, a release SW unit 202, a photometry unit 203, a distance-measuring unit 204, an exposure unit 205, and an image pickup element 206. The camera main body 200 further includes a signal processing unit 207, an image recording unit 208, a camera microcomputer 210, and a communication unit 250 that communicates with the lens apparatus 100. The camera main body 200 includes a camera side mounting unit having a plurality of bayonet claws not shown in FIG. 1. A lens side mounting unit described later couples with the camera side mounting unit, so that the lens apparatus 100 is detachably attached to the camera main body 200. In other words, the lens apparatus 100 is an interchangeable lens mountable to the camera main body 200.

Configuration of Lens Apparatus 100

The lens apparatus 100 includes an image-capturing optical system 101, a focus driving unit 102, a zoom driving unit 103, a diaphragm unit (light amount adjustment unit) 104, a focus position detection unit 105, a zoom position detection unit 106, a lens microcomputer 112, and a memory 111. The lens apparatus 100 further includes a communication unit 150 that communicates with the camera main body 200, a diaphragm unit detection unit 113 that detects a state of the diaphragm unit 104, and a diaphragm driving unit 600 for driving the diaphragm unit 104.

The image-capturing optical system 101 includes a zoom lens unit (zoom optical system) ZLU that moves in an optical axis direction for zooming (magnification variation) and a focus lens unit (focus optical system) FLU that moves in the optical axis direction for focusing (focus adjustment, in-focus). It can be considered that the diaphragm unit 104 is also included in the image-capturing optical system 101. The image-capturing optical system 101 can form an optical image of an object on the image pickup element 206. The optical axis mentioned here is an optical axis of the image-capturing optical system 101. In other words, the optical axis direction mentioned here is a direction in parallel with the optical axis of the image-capturing optical system 101.

The lens unit mentioned here is a term including one lens and a plurality of lenses. In the present embodiment and the second embodiment described later, although the image-capturing optical system 101 includes the zoom lens unit ZLU, the image-capturing optical system 101 need not necessarily include the zoom lens unit ZLU. In other words, the preset function described in the present embodiment and the second embodiment described later may be applied to a fixed focal length lens apparatus instead of the zoom lens.

The focus driving unit 102 and the zoom driving unit 103 include a driving source such as an ultrasonic motor, s DC motor, or a stepping motor, which moves the focus lens unit FLU and the zoom lens unit ZLU in the optical axis direction. The focus driving unit 102 and the zoom driving unit 103 are drive-controlled by the lens microcomputer 112. In other words, when the focus lens unit FLU is an optical element, the focus driving unit 102 is an adjustment unit for adjusting a state of the optical element, more specifically, a position of the optical element. The focus driving unit 102 and the zoom driving unit 103 may have configurations different from each other.

The focus position detection unit 105 detects a position of the focus lens unit FLU on the optical axis and includes an encoder and a magnetic sensor. For example, an output key of the focus driving unit 102 is configured to be rotatable around the optical axis, and when a brush travels on a gray code pattern, a position of a focus lens 152 can be detected from pulses generated from an encoder according to the amount of rotation at the same time when the output key rotates.

Although the zoom position detection unit 106 and the focus position detection unit 105 have the same configuration, the focus position detection unit 105 and the zoom position detection unit 106 may have configurations different from each other.

The lens microcomputer 112 is a lens side control unit (lens side communication unit) that is electrically connected with a camera microcomputer (camera side control unit, camera side communication unit) 210 and performs exchange of information for an image capturing operation. The lens microcomputer 112 is composed of a microcomputer (CPU, processor). The lens microcomputer 112 and the camera microcomputer 210 can perform bidirectional data communication.

The memory (storage unit) 111 holds focus preset information, information for a control method described later, a program of the control method, and other various information. Information for focus preset includes a speed where the focus lens unit FLU is moved to the preset position.

The lens apparatus 100 further includes a transition switch 107 for giving an instruction on transition from a storage instruction mode to a storage mode and a storage mode selection switch 108 for selecting one storage mode from a plurality of storage modes as an operation system. The lens apparatus 100 further includes a detection unit (switch detection unit) 109 that detects a state of the storage mode selection switch 108 and a state notification unit 115 for notifying a user which storage mode is selected according to a state of the detection unit 109. The state notification unit 115 is, for example, a buzzer that makes a sound, an LED that can blink or light, a display panel, or the like. It is possible to notify a user of a currently selected storage mode by a melody, a rhythm, and a sound volume of the sound made by the buzzer, a blinking pattern and a color of the LED, characters and drawings displayed on the display panel, and the like.

The lens apparatus 100 further includes an operation unit 110 and an operation detection unit 114 that detects an operation amount and an operation direction of the operation unit 110 as an operation system. The operation unit 110 is also a driving instruction unit that issues an instruction to return the focus lens to a position stored by the storage mode selection switch 108. The operation unit 110 may be provided in the lens apparatus 100 or may be provided in the camera main body 200. The operation detection unit 114 detects that the operation unit 110 is operated and detects an operation amount and an operation direction when the operation unit 110 is operated.

As described above, the storage mode selection switch 108 is a switch for selecting one storage mode from a plurality of storage modes. The plurality of storage modes mentioned here are a storage mode (single-storage mode) that stores one piece of focus preset information (focus preset position) and a storage mode (plural-storage mode) that stores a plurality of pieces of focus preset information.

When a user turns on the storage mode selection switch 108 once within a predetermined time, a current focus position detected by the focus position detection unit 105, that is, the focus preset information, is stored in the memory 111. In this way, the storage mode selection switch 108 has a function to store the current focus position in the memory 111 in addition to a function to select (switch) the single-storage mode or the plural-storage mode.

The storage mode selection switch 108 is an automatic return mechanical switch. The storage mode selection switch 108 turns on only while being applied with an operation force, and when the operation force is released, the storage mode selection switch 108 turns off. When the user presses the storage mode selection switch 108 longer than a predetermined time, the storage mode transits from the single-storage mode to the plural-storage mode or transits from the plural-storage mode to the single-storage.

The focus position described above is, for example, a position of the focus lens unit FLU where an object at a certain object distance is focused. The focus position (focus preset information) is stored in the memory 111. Thereafter, even when the focus lens unit FLU is moved to a position different from the stored position, it is possible to return the focus lens unit FLU to the position stored in the memory 111 by a return operation. The function described above is a focus preset function.

Appearance of Lens Apparatus 100

Figure 5:
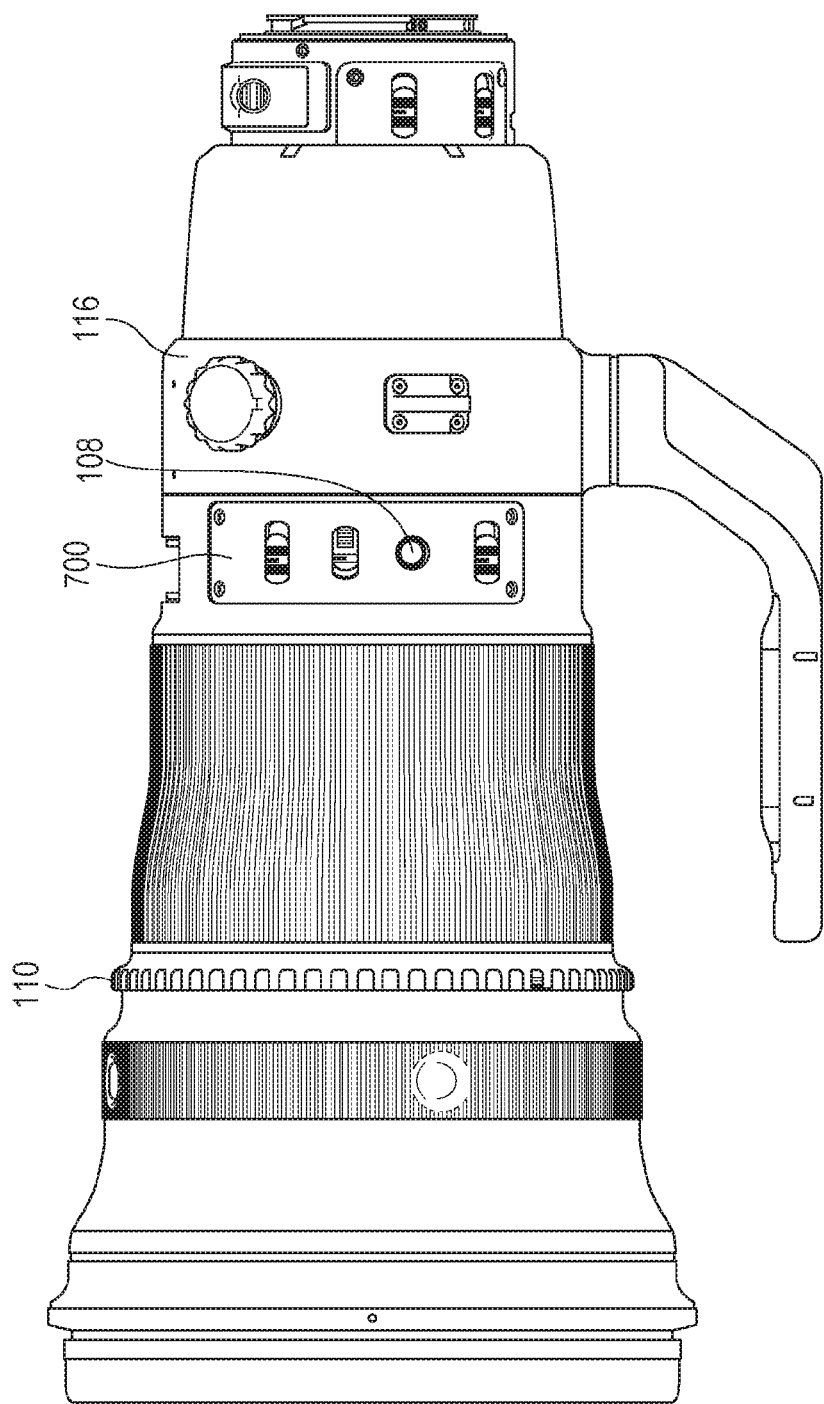
FIG. 5 is an external view of a lens apparatus of each embodiment.

FIG. 5 shows an appearance of the lens apparatus 100. The storage mode selection switch 108 is arranged in a switch panel 700 provided in an exterior portion of the lens apparatus 100. In addition to the storage mode selection switch 108, the transition switch 107 described above is also arranged in the exterior portion of the lens apparatus 100.

A tripod mount ring 116 is a ring that can rotate the lens apparatus 100 around the optical axis so that image capturing can be performed in a vertical position while the lens apparatus 100 is fixed to the tripod mount when image capturing using the tripod is performed.

The operation unit 110 is arranged in the exterior portion of the lens apparatus 100 as a ring member that can rotate around the optical axis of the image-capturing optical system 101. A surface of the operation unit 110 is provided with an anti-slip knurled pattern so that a rotation operation is easily performed. The operation unit 110 is provided with a moving end in each rotation direction of the rotation operation so that the operation unit 110 can be rotated by a predetermined rotation amount around the optical axis.

The operation unit 110 is configured so as to automatically return to a neutral position which is a central position of a rotation movable range when not being applied with an operation force.

When the operation unit 110 is rotated from the neutral position in one rotation direction, it is assumed that the operation of the operation unit 110 is completed in a range from the neutral position to a first predetermined position closer to the neutral position than to the moving end. The operation at this time is defined as a first operation. In this case, the operation detection unit 114 outputs a signal notifying that the operation unit 110 is in a first state (first operation state) to the lens microcomputer 112. Further, when the operation unit 110 is rotated from the neutral position in the one rotation direction, it is assumed that the operation of the operation unit 110 is completed in a range from the first predetermined position described above to the moving end (including the moving end). The operation at this time is defined as a second operation. In this case, the operation detection unit 114 outputs a signal notifying that the operation unit 110 is in a second state (second operation state) to the lens microcomputer 112. For example, when the operation unit 110 can rotate 60 degrees in the one rotation direction from the neutral position, a position 30 degrees in the one rotation direction from the neutral position may be defined as the first predetermined position. Alternatively, for example, when the operation unit 110 can rotate 10 degrees in the one rotation direction from the neutral position, a position 5 degrees in the one rotation direction from the neutral position may be defined as the first predetermined position.

Similarly, when the operation unit 110 is rotated from the neutral position in the other rotation direction, it is assumed that the operation of the operation unit 110 is completed in a range from the neutral position to a second predetermined position closer to the neutral position than to the moving end. The operation at this time is defined as a third operation. In this case, the operation detection unit 114 outputs a signal notifying that the operation unit 110 is in a third state (third operation state) to the lens microcomputer 112. Further, when the operation unit 110 is rotated from the neutral position in the other rotation direction, it is assumed that the operation of the operation unit 110 is completed in a range from the second predetermined position described above to the moving end (including the moving end). The operation at this time is defined as a fourth operation. In this case, the operation detection unit 114 outputs a signal notifying that the operation unit 110 is in a fourth state (fourth operation state) to the lens microcomputer 112. For example, when the operation unit 110 can rotate 60 degrees in the other rotation direction from the neutral position, a position 30 degrees in the other rotation direction from the neutral position may be defined as the second predetermined position. Alternatively, for example, when the operation unit 110 can rotate 10 degrees in the other rotation direction from the neutral position, a position 5 degrees in the other rotation direction from the neutral position may be defined as the second predetermined position.

Therefore, the operation detection unit 114 can detect a total of five states including a state (neutral state) where the operation unit 110 is located in the neutral position as a state of the operation unit 110.

Flowchart of Focus Preset Function

Figure 2:
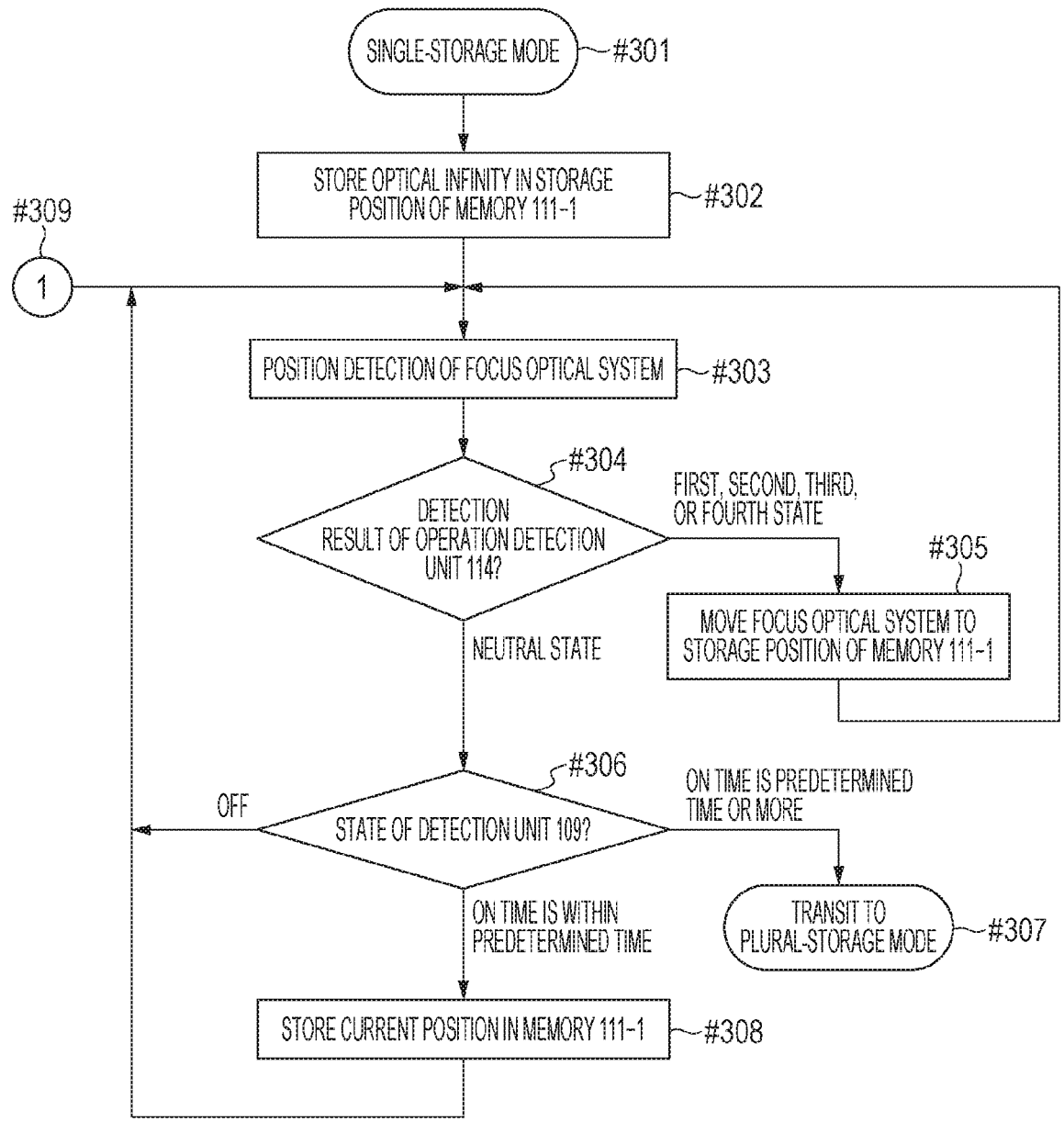
FIG. 2 is a flowchart showing an operation of a single-storage mode of each embodiment.
Figure 3:
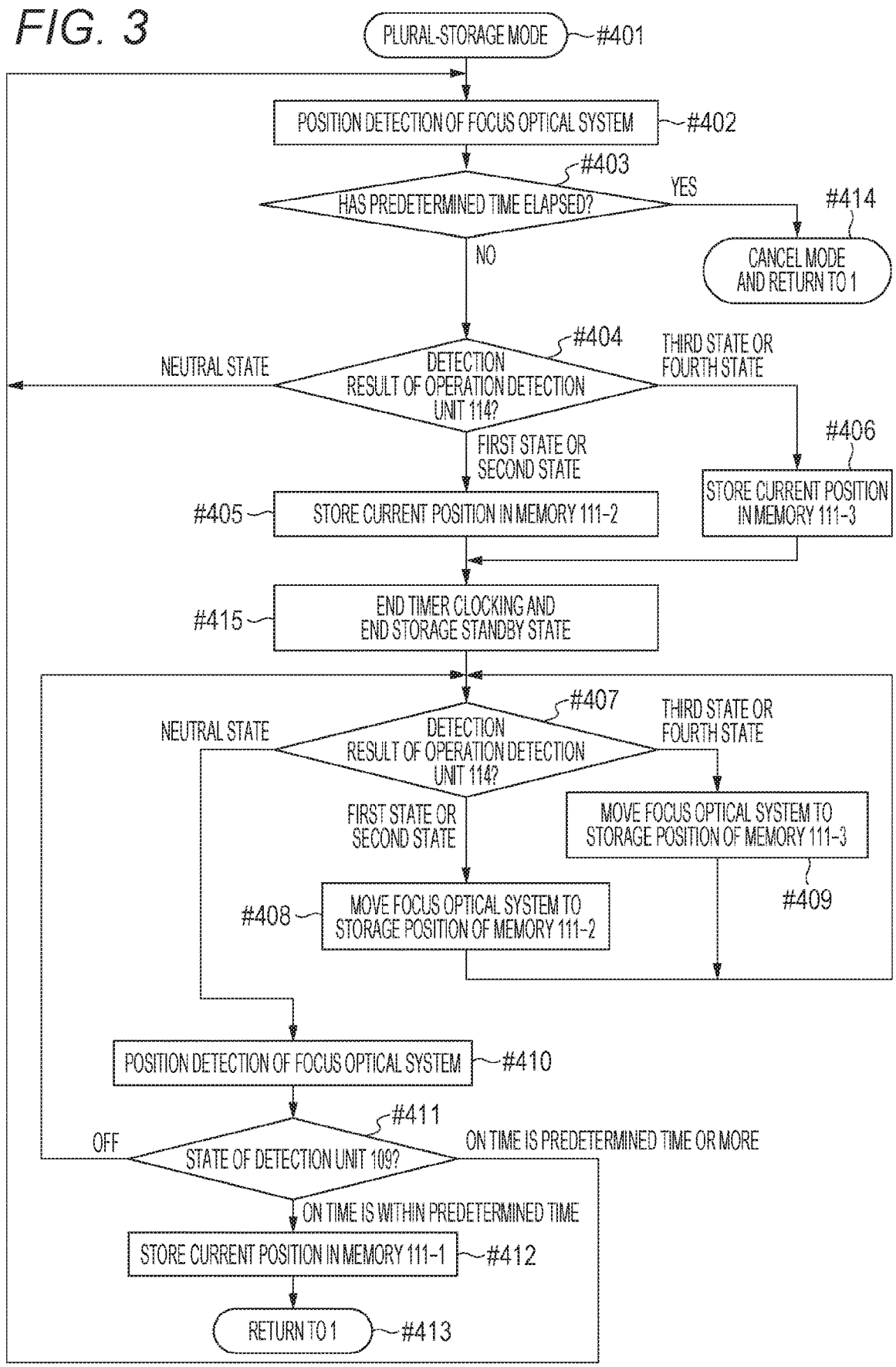
FIG. 3 is a flowchart showing an operation of a plural-storage mode of a first embodiment.

Next, a control method of the lens apparatus 100 related to the focus preset function in the present embodiment will be described with reference to FIGS. 2 and 3. FIGS. 2 and 3 are flowcharts for explaining a control method related to the focus preset function of the present embodiment.

More specifically, FIG. 2 is a flowchart for explaining a control method related to the focus preset function in the single-storage mode, and FIG. 3 is a flowchart for explaining a control method related to the focus preset function in the plural-storage mode.

The control methods shown in FIGS. 2 and 3 are embodied as a program that can be executed by a computer and are executed by the lens microcomputer 112. In an image pickup apparatus (compact digital camera) in which the lens apparatus 100 is integrated into the camera main body 200, the camera microcomputer 210 may perform the operation shown in FIGS. 2 and 3. In the compact digital camera, the storage mode selection switch 108 and the memory 111 may be arranged on the camera main body 200 side.

Control in Single-Storage Mode

First, the control of the focus preset function in the single-storage mode will be described with reference to the flowchart shown in FIG. 2. The flowchart shown in FIG. 2 shows control from an initial state where the camera main body 200 and the lens apparatus 100 are electrically connected and the power supply SW unit 201 of the camera main body 200 is turned on.

When a user turns on the power supply SW unit 201 of the camera main body 200 and power is supplied from the camera main body 200 to the lens apparatus 100, the lens microcomputer 112 sets the storage mode to the single-storage mode (#301). Then, a focus position where infinity is focused is stored in a first memory 111-1 included in the memory 111 (#302). The step of #302 need not be performed. In other words, the focus position where infinity is focused may be stored in the first memory 111-1 in advance.

Next, the focus position detection unit 105 detects a focus position which is a current position in the optical axis direction of the focus lens unit FLU (#303).

Next, the lens microcomputer 112 detects an operation state of the operation unit 110 by the operation detection unit 114 (#304). After a predetermined time has elapsed since the operation unit 110 was operated, the operation detection unit 114 can acquire information of an operation direction and the amount of operation. When the operation detection unit 114 detects that the state of the operation unit 110 is any one of the aforementioned first, second, third, and fourth states, the focus lens unit FLU is moved to the focus position stored in the first memory 111-1 (#305). The focus lens unit FLU at this time moves at a highest speed that can be driven by the focus driving unit 102 in any one of the first, second, third, and fourth states. Alternatively, the focus lens unit FLU moves at a low driving speed (first driving speed) set in advance in the first and the third states, and the focus lens unit FLU may move at a high driving speed (second driving speed faster than the first driving speed) set in advance in the second and the fourth states.

Next, when the operation detection unit 114 detects that the operation unit 110 is in the neutral state, the lens microcomputer 112 detects the state of the storage mode selection switch 108 by the detection unit 109 (#306). When the detection unit 109 detects that the storage mode selection switch 108 is operated for a long time (for example, 1.5 seconds or more) set in advance, the storage mode transits from the current single-storage mode to the plural-storage mode where a plurality of preset positions can be stored and restored (#307). At this time, a buzzer, which is the state notification unit 115, beeps twice, or an LED, which is the state notification unit 115, blinks.

When the detection unit 109 detects that the storage mode selection switch 108 is operated for a short time (for example, a time shorter than 1.5 seconds) set in advance, the current position of the focus lens unit FLU detected in #303 is stored in the first memory 111-1 (#308). In other words, in #308, the position of the focus lens unit FLU stored in #302 is overwritten by the current position.

After #308, the control returns to #303, and the position of the focus lens unit FLU is detected again. When it is detected that the operation unit 110 is not in the neutral state, in other words, the operation unit 110 is operated in any way, the focus lens unit FLU moves to the position stored in #308. In this way, it is possible to perform focus preset to an arbitrary position for a user.

Control in Plural-Storage Mode

Next, the plural-storage mode will be described with reference to the flowchart shown in FIG. 3. As described above, when it is determined that the storage mode selection switch 108 is ON for a predetermined time or more by the detection unit 109, the storage mode transits from the single-storage mode to the plural-storage mode (#307). The flowchart shown in FIG. 3 shows control after the lens apparatus 100 shifts to the plural-storage mode. In a state where the camera main body 200 and the lens apparatus 100 are electrically connected and the power supply SW unit 201 of the camera main body 200 is turned on, the storage mode first becomes the single-storage mode. In the single-storage mode, a focus position where infinity is focused is stored in the first memory 111-1 included in the memory 111 (#302). Further, the focus position where infinity is focused is stored in advance in a second memory 111-2 included in the memory 111, and a focus position where a very close position is focused is stored in advance in a third memory 111-3 included in the memory 111. A configuration may be employed in which no focus position is stored at first in the memory 111-2 and the memory 111-3, and when it is detected that the storage mode becomes the plural-storage mode, the above information is stored in the memories 111-2 and 111-3. Further, a configuration may be employed in which the same focus position is stored in advance in the memories 111-2 and 111-3.

When the storage mode transits to the plural-storage mode, a position of the focus lens unit FLU is detected (#402). Next, it is determined whether or not a predetermined time (for example, two seconds) is measured by a timer not shown in the drawings (#403). Next, it is determined whether or not the operation unit 110 is operated and a detection result of the operation detection unit 114 is changed before the predetermined time has elapsed (#404). When the detection result of the operation detection unit 114 is not changed even if the predetermined time has elapsed, that is, when the operation unit 110 is not operated within the predetermined time, the plural-storage mode is canceled and the control returns to "1" (#309) in the flowchart shown in FIG. 2 (#414).

When the operation detection unit 114 detects that the operation unit 110 is in the first state or the second state, a current position of the focus lens unit FLU is stored in the memory 111-2 (#405). When the operation detection unit 114 detects that the operation unit 110 is in the third state or the fourth state, a current position of the focus lens unit FLU is stored in the memory 111-3 (#406). When it is detected in #404 that the operation unit 110 is in the neutral state, more specifically, when it is detected that the operation unit 110 is not operated before the predetermined time has elapsed, the control returns to #402.

When the position of the focus lens unit FLU is stored in one of the memories 111-2 and 111-3, the buzzer, which is the state notification unit 115, beeps, or a blinking state of the LED, which is the state notification unit 115, is canceled. Then, timer clocking is once stopped, and a standby state of storage is released (#415).

Next, the detection result of the operation detection unit 114, that is, the state of the operation unit 110, is checked (#407). When it is detected that the operation ring 110 is operated to be in the first state or the second state, the focus is moved to the position of the focus lens unit FLU stored in the memory 111-2 (#408). When it is detected that the operation ring 110 is operated to be in the third state or the fourth state, the focus is moved to the position of the focus lens unit FLU stored in the memory 111-3 (#409).

The driving speed at this time is a maximum speed that can be driven by the focus driving unit 102 in any of the first, the second, the third, and the fourth states. Alternatively, for example, in the first and the third states, the focus lens unit FLU may be moved at a low driving speed (first driving speed) set in advance. In the second and the fourth states, the focus lens unit FLU may be moved at a high driving speed (second driving speed faster than the first driving speed) set in advance.

When a signal indicating the neutral state is still outputted as a result of checking the detection result of the operation detection unit 114 in #407, this indicates that the operation of the operation unit 110 is not performed. In this case, the position of the focus lens unit FLU is detected (#410), and the state of the detection unit 109 is checked (#411). When the detection unit 109 detects in #411 that the storage mode selection switch 108 is operated for a long time (for example, 1.5 seconds or more) set in advance, the control returns to #402.

It is assumed that the detection unit 109 detects in #411 that the storage mode selection switch 108 is operated for a short time (for example, a time shorter than 1.5 seconds) set in advance. In this case, the current position of the focus lens unit FLU detected in #410 is stored in the memory 111-1 (the position stored in #302 is overwritten by the current position)(#412). Then, the storage mode returns from the plural-storage mode to the single-storage mode (#413).

When the detection unit 109 detects in #411 that the storage mode selection switch 108 is in an off state, in other words, when the detection unit 109 cannot detect a state in which the storage mode selection switch 108 is operated, the control returns from #411 to #407.

Effects Obtained by the Present Embodiment

As described above, in the present embodiment, it is possible to store a plurality of preset positions according to the state of the operation unit 110 in the plural-storage mode.

More specifically, the lens apparatus (optical apparatus) 100 is in a storage mode where the memory (storage unit) 111 stores a state of the focus lens unit (optical element) FLU. When a first operation (for example, an operation to put the operation unit 110 into a first state) is performed on the operation unit 110, the memory 111 stores a first state of the focus lens unit FLU. The first state of the focus lens unit FLU mentioned here is a position of the focus lens unit FLU detected by the focus position detection unit 105 when the first operation is performed. When a second operation (for example, an operation to put the operation unit 110 into a third state) different from the first operation is performed on the operation unit 110, the memory 111 stores a second state of the focus lens unit FLU. The second state of the focus lens unit FLU mentioned here is a position of the focus lens unit FLU detected by the focus position detection unit 105 when the second operation is performed.

When the first operation is performed on the operation unit 110 after the memory 111 stores the first state of the focus lens unit FLU, the focus driving unit 102 puts the state of the focus lens unit FLU into the first state. Further, when the second operation is performed on the operation unit 110 after the memory 111 stores the second state of the focus lens unit FLU, the focus driving unit 102 puts the state of the focus lens unit FLU into the second state.

As described above, according to the present embodiment, it is possible to provide an optical apparatus that can store two preset positions different from each other with a configuration simpler than before. This is because it is possible to store a preset position according to a type of operation performed on the operation unit 110 as described above. In other words, the lens apparatus 100 shown in the present embodiment can store a plurality of preset positions by using one operation unit without preparing operation units whose number is the same as the number of preset positions desired to be stored.

Second Embodiment

Figure 4:
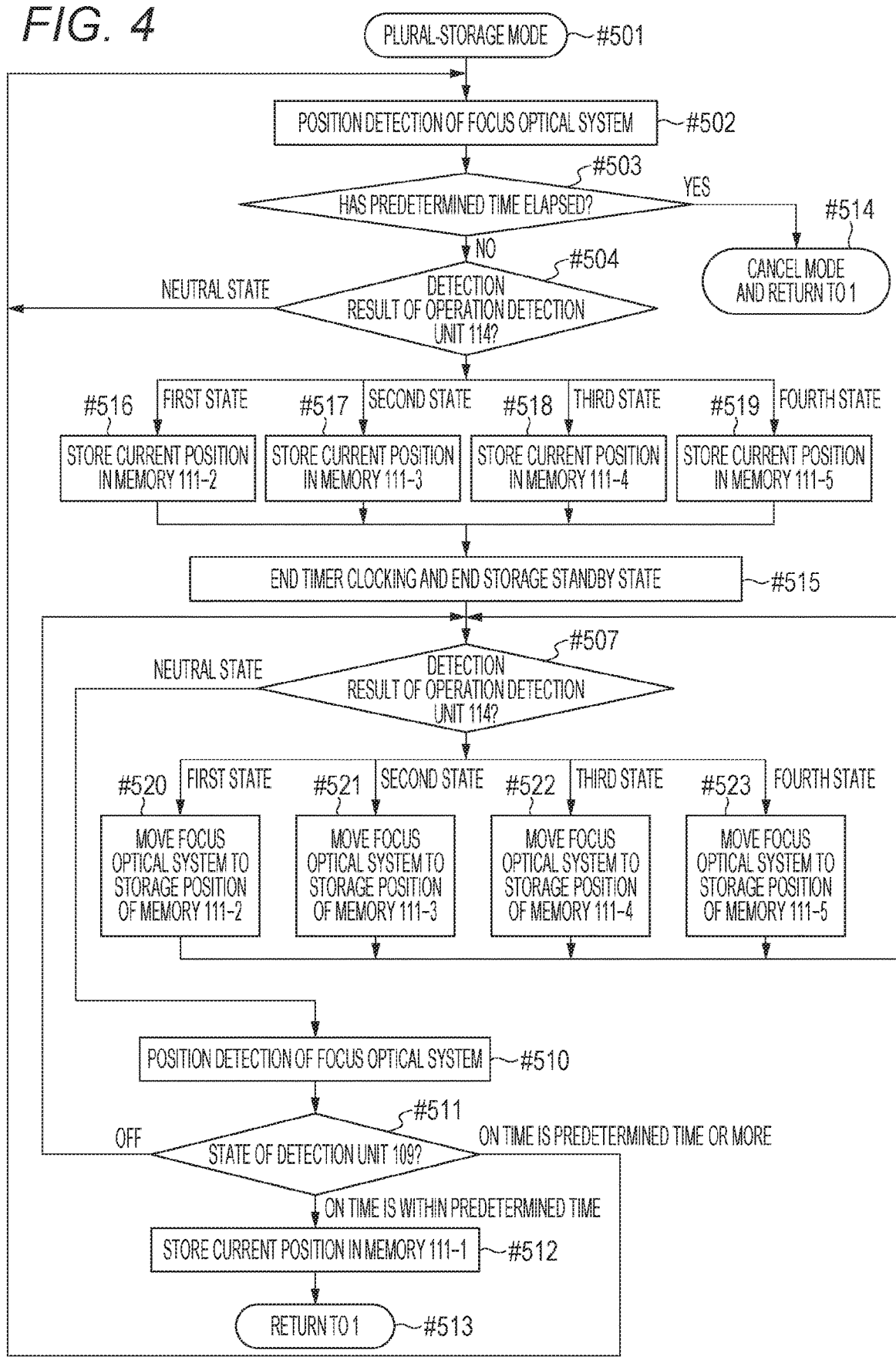
FIG. 4 is a flowchart showing an operation of a plural-storage mode of a second embodiment.

The plural-storage mode in the present embodiment will be described with reference to a flowchart shown in FIG. 4. The control in the single-storage mode is the same as that in the first embodiment described above.

A state in which the camera main body 200 and the lens apparatus 100 are electrically connected and the power supply SW unit 201 of the camera main body 200 is turned on is defined as an initial state. In the initial state, predetermined focus positions different from each other are stored in a second memory 111-2, a third memory 111-3, a fourth memory 111-4, and a fifth memory 111-5, respectively, included in a memory 111. The focus positions to be stored in the memories 111-2 to 111-5 may be set as described below. Two focus positions that divide a movable range of the focus lens unit FLU into three equal portions, a focus position at a moving end on the closest side, and a focus position at a moving end on the infinity side may be assigned and stored in the memories 111-2 to 111-5.

As described above, when it is determined that the detection unit 109 is ON for a predetermined time or more, the storage mode transits from the single-storage mode to the plural-storage mode. When the storage mode transits to the plural-storage mode, the position of the focus lens unit FLU is detected (#502). Next, it is determined whether or not a predetermined time (for example, two seconds) is measured by a timer not shown in the drawings (#503). Next, it is determined whether or not the operation unit 110 is operated and a detection result of the operation detection unit 114 is changed before the predetermined time has elapsed (#504).

When the detection result of the operation detection unit 114 is not changed even if the predetermined time has elapsed, that is, when the operation unit 110 is not operated within the predetermined time, the plural-storage mode is canceled and the control returns to "1" (#309) in the flowchart shown in FIG. 2 (#514). When the operation detection unit 114 detects that the operation unit 110 is in the neutral state within the predetermined time, in other words, when it is detected that the operation unit 110 is not operated within the predetermined time, the control returns to #502.

When the operation detection unit 114 detects that the operation unit 110 is operated within the predetermined time and the operation unit 110 is in the first state, a current position of the focus lens unit FLU is stored in the memory 111-2 (#516). When the operation detection unit 114 detects that the operation unit 110 is operated within the predetermined time and the operation unit 110 is in the second state, a current position of the focus lens unit FLU is stored in the memory 111-3 (#517). When the operation detection unit 114 detects that the operation unit 110 is operated within the predetermined time and the operation unit 110 is in the third state, a current position of the focus lens unit FLU is stored in the memory 111-4 (#518). When the operation detection unit 114 detects that the operation unit 110 is operated within the predetermined time and the operation unit 110 is in the fourth state, a current position of the focus lens unit FLU is stored in the memory 111-5 (#519).

When a focus position is stored in one of the memories 111-2 to 111-5, the buzzer, which is the state notification unit 115, beeps, or a blinking state of the LED, which is the state notification unit 115, is canceled. Then, timer clocking is once stopped, and a standby state of storage is released (#515).

Next, the detection result of the operation detection unit 114 is checked (#507). As a result, when it is detected that the operation ring 110 is operated to be in the first state, the focus lens unit FLU is moved to the position stored in the memory 111-2 in #516 (#520). Alternatively, when it is detected that the operation ring 110 is operated to be in the second state, the focus lens unit FLU is moved to the position stored in the memory 111-3 in #517 (#521). Alternatively, when it is detected that the operation ring 110 is operated to be in the third state, the focus lens unit FLU is moved to the position stored in the memory 111-4 in #518 (#522). Alternatively, when it is detected that the operation ring 110 is operated to be in the fourth state, the focus lens unit FLU is moved to the position stored in the memory 111-5 in #519 (#523). The driving speed at this time is a maximum speed that can be driven by the focus driving unit 102 in any of the first, the second, the third, and the fourth states. Alternatively, the driving speed may be, for example, a predetermined driving speed that is set in advance.

When a signal indicating the neutral state is still outputted as a result of checking the detection result of the operation detection unit 114 in #507, this indicates that the operation of the operation unit 110 is not performed. In this case, the position of the focus lens unit FLU is detected (#510), and the state of the detection unit 109 is checked (#511). When the detection unit 109 detects in #511 that the storage mode selection switch 108 is operated for a long time (for example, 1.5 seconds or more) set in advance, the control returns to #502.

It is assumed that the detection unit 109 detects in #511 that the storage mode selection switch 108 is operated for a short time (for example, a time shorter than 1.5 seconds) set in advance. In this case, the current position of the focus lens unit FLU detected in #510 is stored in the memory 111-1 (the position stored in #502 is overwritten by the current position)(#512). Then, the storage mode returns from the plural-storage mode to the single-storage mode (#513).

When the detection unit 109 detects In #511 that the storage mode selection switch 108 is in an off state, in other words, when the detection unit 109 cannot detect a state in which the storage mode selection switch 108 is operated, the control returns from #511 to #507.

Effects Obtained by the Present Embodiment

As described above, in the present embodiment, it is possible to store four focus positions, whose number is greater than that of the first embodiment described above, as focus preset information. More specifically, the operation detection unit 114 can detect a first operation parameter and a second operation parameter from among a direction, a time, an amount, and a speed, where the operation unit 110 is operated. The memory 111 can store three or more positions of the focus lens unit FLU based on the first operation parameter and the second operation parameter. In the present embodiment, the first operation parameter is a direction (clockwise or counterclockwise) and the second operation parameter is an amount (large or small).

Therefore, according to the present embodiment, it is possible to provide an optical apparatus that can cope with image capturing conditions, whose number is greater than that of the first embodiment described above, by performing focus preset.

Modified Examples

The embodiments described above are only typical examples, and it is possible to variously modify and change the embodiments when implementing the disclosure.

For example, in the embodiments described above, the information to be stored in the memory 111 is the position of the focus lens unit FLU. However, the aspect of the embodiments is not limited to such a configuration. The information to be stored in the memory 111 may be parameters such as, for example, a position of the zoom lens unit ZLU, an aperture diameter or a position of the diaphragm unit 104, and an ISO sensitivity, which change image capturing conditions. In this case, the lens apparatus 100 or the camera main body 200 may be provided with a detection unit that detects these pieces of information. The adjustment units in this case are the zoom driving unit 103, the diaphragm driving unit 600, and the like.

Further, in the embodiments described above, the storage mode selection switch 108 is configured as a push button that automatically returns to an off state when an operation force is released, and a mode is selected according to time where the storage mode selection switch 108 is on. However, the aspect of the embodiments is not limited to such a configuration. For example, a configuration can be employed where the storage mode is selected based on the number of times the storage mode selection switch 108 is turned on within a predetermined time. More specifically, a configuration can be employed where the single-storage mode is enabled when the storage mode selection switch 108 is single-clicked and the plural-storage mode is enabled when the storage mode selection switch 108 is double-clicked.

Further, a touch sensor is used as the storage mode selection switch 108, a finger movement locus is identified by the touch sensor, and the storage mode may be selected based on the finger movement locus. Furthermore, transition from the storage mode to a reproduction mode may be performed based on the finger movement locus identified by the touch sensor. The reproduction mode mentioned here is a mode where a return operation (reproduction operation) for moving the focus lens unit FLU to a position stored in the storage mode can be performed. Alternatively, the reproduction mode may be enabled after the focus position (focus preset position), which is a return target, is stored.

Further, in the embodiments described above, the operation unit 110 is configured as a ring member rotatable around the optical axis (rotational axis) of the lens apparatus 100 with respect to an exterior member. Therefore, the same operability can be maintained when image capturing is performed in a normal position and when image capturing is performed in a vertical position. This configuration can cope with a case where the operation ring 110 is desired to be quickly operated. However, the aspect of the embodiments is not limited to such a configuration. For example, the operation unit 110 may be an operation unit that can move in the optical axis direction.

Further, in the embodiments described above, a case where the operation unit 110 is operated in a counterclockwise direction by a small angle as seen from a photographer who operates the camera main body 200 is defined as the first state, and a case where the operation unit 110 is operated in the counterclockwise direction by a larger angle is defined as the second state. A case where the operation unit 110 is operated in a clockwise direction by a small angle as seen from the photographer who operates the camera main body 200 is defined as the third state, and a case where the operation unit 110 is operated in the clockwise direction by a larger angle is defined as the fourth state.

In other words, as described above, the first operation parameter is a direction (clockwise or counterclockwise) and the second operation parameter is an amount (large or small). However, the aspect of the embodiments is not limited to such a configuration. For example, the first operation parameter may be a direction, and the second operation parameter may be a speed. In this case, for example, a case where the operation unit 110 is operated in the counterclockwise direction at a low speed as seen from the photographer who operates the camera main body 200 may be defined as the first state, and a case where the operation unit 110 is operated in the counterclockwise direction at a higher speed may be defined as the second state. Further, in this case, a case where the operation unit 110 is operated in the clockwise direction at a low speed as seen from the photographer who operates the camera main body 200 may be defined as the third state, and a case where the operation unit 110 is operated in the clockwise direction at a higher speed may be defined as the fourth state.

Further, for example, a case where an operation unit that can move in the optical axis direction is used and the operation unit is moved toward an object side by a small moving amount may be defined as the first state, and a case where the operation unit is moved toward the object side by a larger moving amount may be defined as the second state. Further, a case where the operation unit is moved toward the camera main body 200 side by a small moving amount may be defined as the third state, and a case where the operation unit is moved toward the camera main body 200 side by a larger moving amount may be defined as the fourth state.

The operation unit 110 may be an operation unit that can move in the optical axis direction and can rotate around the optical axis. In this case, it is possible to detect much more states as compared with the embodiments described above, and it is possible to store much more pieces of preset information. The operation unit 110 may be a lever type middle point return switch. In this case, the state of the operation unit 110 is determined according to a moving direction and a moving amount, and the focus position may be stored according to the state, or a return operation to a stored position may be performed.

In the embodiments described above, the lens apparatus 100, which is an interchangeable lens, is defined as the optical apparatus, and the focus preset function of the optical apparatus is described. However, a camera system where a lens apparatus and a camera main body are integrated together may be defined as the optical apparatus, and the focus preset function of the embodiments described above may be applied to the optical apparatus.

The control in each embodiment described above is performed by the lens microcomputer 112. However, the control may be performed by the camera microcomputer 210 based on information received from the lens microcomputer 112.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2018-121368, filed Jun. 26, 2018, which is hereby incorporated by reference herein in its entirety.

What is claimed is:

1. An apparatus comprising:
an optical element;
an adjustment unit configured to adjust a state of the optical element;
a detection unit configured to detect the state of the optical element adjusted by the adjustment unit;
a storage unit configured to store the state of the optical element detected by the detection unit; and
an operation unit configured to perform at least a first operation and a second operation,
wherein
when in a plural-storage mode in which a plurality of states of the optical element is stored in the storage unit, in a case where the first operation is performed on the operation unit, a first state of the optical element detected by the detection unit when the first operation is performed is stored in the storage unit,
when in the plural-storage mode in which the plurality of states of the optical element is stored in the storage unit, in a case where the second operation is performed on the operation unit, a second state of the optical element detected by the detection unit when the second operation is performed is stored in the storage unit,
when in a case where the first operation is performed after the first state and the second state are stored in the storage unit, the optical element is put into the first state, and
when the second operation is performed after the first state and the second state are stored in the storage unit, the optical element is put into the second state.

2. The apparatus according to claim 1, wherein
the apparatus includes a single storage mode where only one state of the optical element is stored in the storage unit, in addition to the plural-storage mode,
the apparatus further includes a selector configured to select one of the first single-storage mode and the plural-storage mode.

3. The apparatus according to claim 2, wherein
the selector is a switch which becomes ON state when an operation force is applied and which becomes OFF state when the operation force is released.

4. The apparatus according to claim 3, wherein
when a time in which the selector is in the ON state is a predetermined time or more, the storage mode of the apparatus switches from one of the single-storage mode and the plural-storage mode to the other.

5. The apparatus according to claim 1, wherein
when the first operation or the second operation is completed, the operation unit becomes a neutral state which is a state before the first operation or the second operation is performed.

6. The apparatus according to claim 1, further comprising an operation detection unit configured to detect at least one of a direction, a time, an amount, and a speed, where the operation unit is operated,
wherein the first operation and the second operation are different from each other in at least one of the direction, the time, the amount, and the speed, where the operation unit is operated.

7. The according to claim 6, wherein
the operation detection unit detects a first operation parameter and a second operation parameter from among the direction, the time, the amount, and the speed, where the operation unit is operated, and
the storage unit stores three or more states of the optical element based on the detected first operation parameter and the detected second operation parameter.

8. The apparatus according to claim 1, wherein
the operation unit rotates around a rotational axis in first and second directions different from each other.

9. The apparatus according to claim 8, further comprising a system including the optical element,
wherein
the rotational axis is an optical axis of the system, and
the operation unit is an operation ring rotatable around the optical axis with respect to an exterior member of the apparatus.

10. The apparatus according to claim 1, wherein
the optical element is a focus lens unit that moves for focusing, and
the state of the optical element is a position of the focus lens unit.

11. The apparatus according to claim 1, wherein
the optical element is a zoom lens unit that moves for zooming, and
the state of the optical element is a position of the zoom lens unit.

12. The apparatus according to claim 1, wherein
the optical element is a diaphragm unit for light amount adjustment, and
the state of the optical element is at least one of an aperture diameter and a position of the diaphragm unit.

13. The apparatus according to claim 1, wherein the apparatus is a lens apparatus mountable to a camera main body including an image pickup element.

14. The apparatus according to claim 1, wherein
the apparatus is a camera system including a camera main body having an image pickup element and a lens apparatus attached to the camera main body.

15. The apparatus according to claim 14, wherein
the optical element is the image pickup element, and
the state of the optical element is an ISO sensitivity.

* * * * *